May 19, 1964

A. H. SCHMALFELDT 3,133,303

WINDSHIELD WIPER CONTROL SYSTEM

Filed Jan. 16, 1963

INVENTOR
ALFRED H. SCHMALFELDT
BY
ATTORNEYS

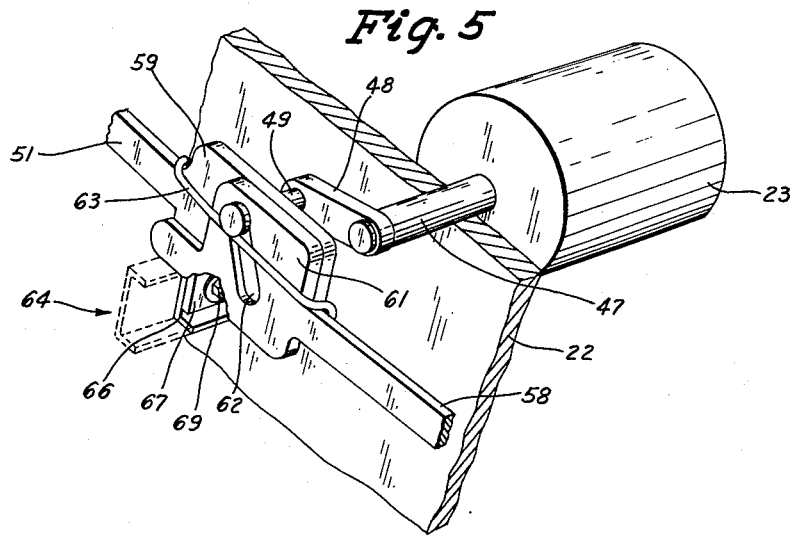
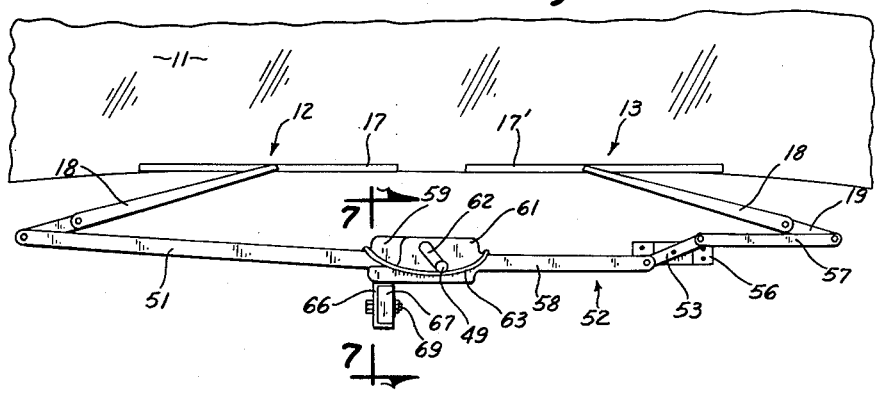
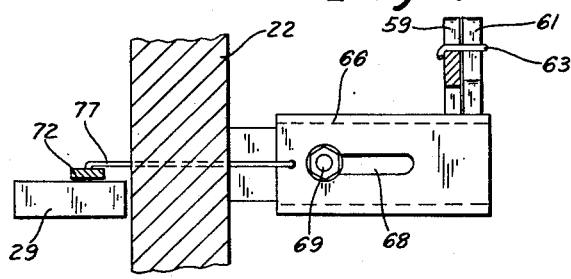

United States Patent Office 3,133,303
Patented May 19, 1964

3,133,303
WINDSHIELD WIPER CONTROL SYSTEM
Alfred H. Schmalfeldt, Des Moines, Iowa, assignor to The Delman Company, Cookeville, Tenn., a corporation of Tennessee
Filed Jan. 16, 1963, Ser. No. 251,862
10 Claims. (Cl. 15—250.16)

This invention relates to windshield wiper apparatus for motor vehicles, and more particularly to a control system for operating the wiper assembly in a normal wiping pattern and parking the wiping assembly outside of the normal wiping pattern.

It is the object of the present invention to provide an improved windshield wiper control system which includes a reversible driving means, linkage means connecting the driving means to the wiper assembly and stop means adapted to engage the linkage means whereby upon reverse movement of the linkage means the wiper assembly moves to a park position.

Another object of the invention is to provide an actuating linkage for a windshield wiper actuating assembly which has an effective length that automatically increases or decreases in response to the direction of rotation of the wiper drive motor.

A further object of the invention is to provide a wiper actuating assembly having a reversible motor and an actuating linkage wherein the reversal of the motor automatically effects an increase in the effective length of the linkage and thereby results in the parking of the wiper assembly.

An additional object of the invention is to provide a control system for a wiper assembly from a minimum number of parts and which is simple and rugged in construction and reliable and efficient in use.

Referring to the drawing:

FIG. 5 is an enlarged perspective view of the wiper actuating linkage of FIG. 1;

FIG. 6 is an enlarged elevation view of the windshield wiper assembly and the actuating linkage therefor in the parked position of the wiper blade; and FIG. 7 is a sectional view taken along the line 7—7 of FIG. 6.

Figure 1:
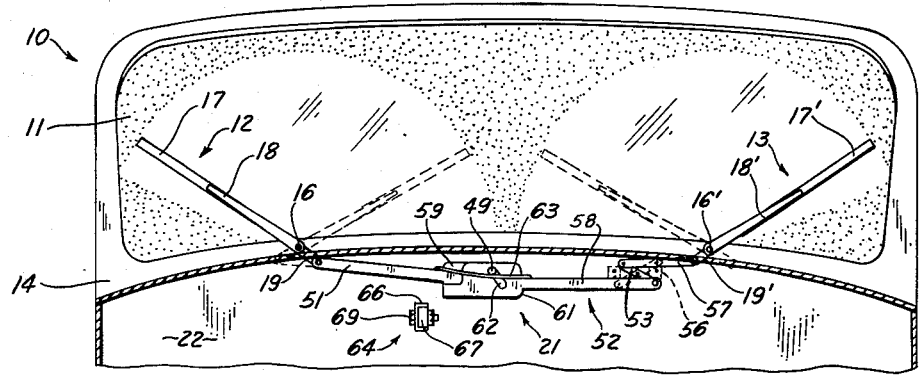
FIG. 1 is a front view of an automobile body illustrating the windshield wiper assembly and the actuating linkage therefor.

Referring to the drawing, there is shown in FIG. 1 a front view of a motor vehicle 10 having a windshield 11. The foreign material such as water and snow which may be deposited on the windshield is removed therefrom by left and right wiper assemblies 12 and 13 each of which is pivotally mounted on the cowl 14 of the vehicle for movement in an arcuate path over the surface of the windshield. The wiper assemblies 12 and 13 are rotatably mounted on the cowl 14 by means of shafts 16 and 16' and include wiper elements 17 and 17' which engage the surface of the windshield. The wiper elements 17 and 17' are supported by means of wiper arms 18 and 18' which are connected at one end to a mid-section of the wiper elements 17 and 17' and at the other end to the shafts 16 and 16'. The wiper arms 18 and 18' are provided with spring means (not shown) which resiliently bias the wiper elements 17 and 17' toward the windshield 11. Crank arms 19 and 19' connected at one end to the shafts 16 and 16' extend below the cowl 14 and are reciprocated in an arcuate path to move the wiper elements 17 and 17' across the windshield 11 in a normal wiping pattern, indicated by the dotted line position of the wiper assemblies and to a park position adjacent the lower edge of the windshield 11 as shown in FIG. 6.

Figure 2:
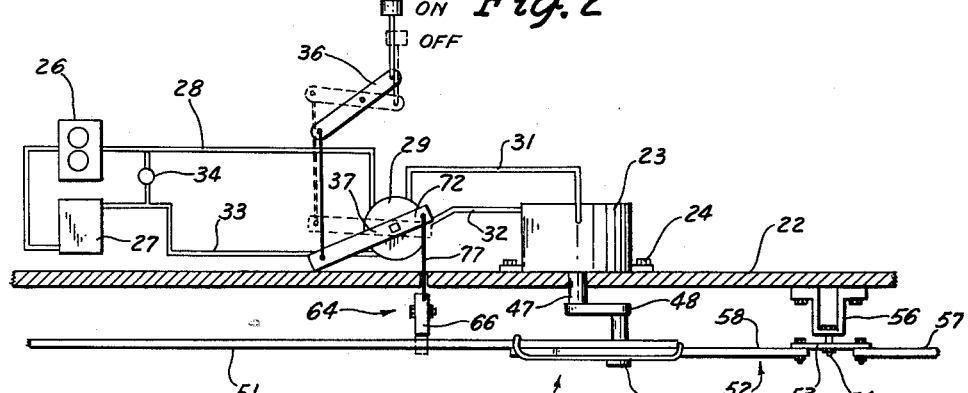
FIG. 2 is an enlarged plan view of the wiper actuating linkage and wiper control system of FIG. 1.

A wiper control system 21 is mounted on the fire wall 22 and operatively connected to the lower ends of the crank arms 19 and 19' for moving the wiper assemblies 12 and 13 in an arcuate path across the windshield 11. As shown in FIGS. 1 and 2, the control system 21 comprises a fluid motor 23, such as a gear or a vane-type motor, secured to the mid-section of the fire wall 22 by means of screws 24 and operated by fluid pressure from a fluid pressure source such as a pump 26 and a reservoir 27. The source of fluid pressure may be obtained directly from the vehicle's transmission or power steering mechanism. The pump 26 feeds fluid under pressure through an inlet line 28 to a control valve 29 which is operable to reverse the flow of fluid pressure to the motor 23. Fluid lines 31 and 32 provide fluid communication between the valve 29 and the motor 23 and fluid line 33 connects the valve 29 with the reservoir 27. The pressure in the fluid system is controlled by a by-pass valve 34 connected between the inlet line 28 and the exhaust line 33.

Figure 3:
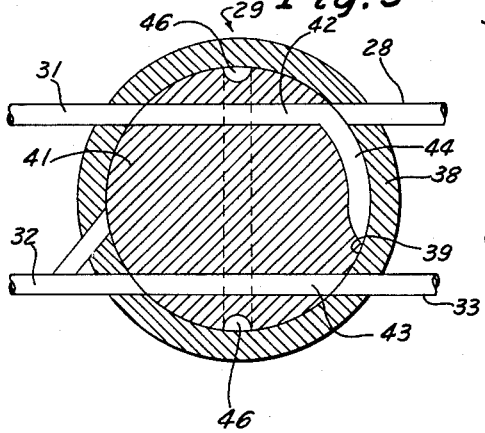
FIG. 3 is a sectional view of the fluid control valve of the wiper control system of FIG. 2 in the wiper operating position.

The control valve 29 is moved between a wiper on position, indicated by the full line, and a wiper off position, indicated by the broken line, by means of a manually controlled linkage 36 which includes a lever 37 secured at one end to the valve 29 and operable by the vehicle operator. Referring to FIG. 3, the valve 29 is shown in the wiper on position. The valve 29 includes a housing 38 having a cylindrical bore 39 adapted to receive a cylindrical valve body 41. The body 41 is provided with first and second passages 42 and 43 which provide fluid communication between the inlet line 28 and the motor supply line 31 and fluid communication between the motor exhaust line 32 and the fluid return line 33.

Figure 4:
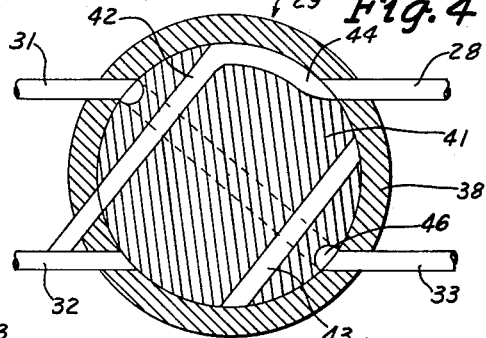
FIG. 4 is a sectional view of the fluid control valve shown in FIG. 4 in the wiper off position.

The lever 37 is secured to a central portion of the cylindrical valve body 41 and when moved to the off position as shown in FIG. 4 the first passage 42 by means of a peripheral spur passage 44 provides fluid communication between the inlet line 28 and the motor fluid line 32 thereby reversing the flow of fluid through the motor 23. The valve body 41 has a diametrical third passage 46 which provides fluid communication between the fluid motor line 31 and the fluid return line 33.

As shown in FIGS. 2 and 5, the motor 23 has a drive shaft 47 which projects through the fire wall 22. A crank arm 48 is secured to the outer end of the drive shaft 47 and has at its outer end a crank pin 49 which extends in a forward direction substantially parallel to the axis of the drive shaft 47. When the valve 29 is in the on position, as shown in FIG. 3, the fluid motor 23 rotates the drive shaft 47 in a clockwise direction moving the crank pin 49 in a clockwise circular path.

The rotary motion of the revolving crank pin 49 is transmitted to the crank arms 19 and 19' of the left and right wiper assemblies 12 and 13 by means of an oppositely extended link 51 and linkage 52. One end of the link 51 is connected to the crank arm 19 and the other end to the crank pin 49. The linkage 52 comprises a lever 53 pivotally mounted at its mid-section by means of a pin 54 and a bracket 56 to the fire wall 22. A link 57 connects the upper end of the lever 53 with the lower end of the crank arm 19' of the right wiper assembly 13. The lower end of the lever 53 is connected by means of a link 58 to the crank pin 49. The link 51 and the linkage 52 provide the wiper assemblies 12 and 13 with synchronized opposite motion. In order to provide the wiper assemblies 12 and 13 with synchronized similar motion the link 58 need only be extended in length and connected directly to the lower end of the crank arm 19' of the right wiper assembly 13.

The inner ends of the respective links 51 and 58 are formed in rectangular-shaped heads 59 and 61, respectively, each head containing a diagonal slot 62 which extends upwardly at an angle of between 45° and 60° with respect to the longitudinal axis of the links 51 and 58 respectively. The longitudinal axis of the slot 62 does not coincide with the arc of the crank pin 49. The slot intersects the arc of the crank pin 49 so that movement of the pin 49 in the slot 62 effectively increases or decreases the length of the link 51 and the linkage 52. The crank pin 49 is positioned at the top end of the slot 62 by means of a leaf spring 63 which has its opposite ends humped over the links 51 and 58 adjacent the heads 59 and 61.

Positioned below but within the path of movement of the link 51 and linkage 52 is a stop means 64 which is movable into and out of the path of movement of the oscillating links 51 and 58. The stop means 64 comprises a channel-shaped member 66 slidably mounted on a forwardly projected support 67 which is secured to the fire wall 22. As shown in FIGS. 5 and 7, the channel-shaped member 66 is positioned over the support 67. The web of the channel-shaped member 66 is provided with a longitudinally extended slot 68 through which a bolt 69 projects to secure the channel-shaped member to the support 67 and guide the channel-shaped member for movement on the support.

As shown in FIG. 2, the channel-shaped member 66 is connected by means of a Bowden wire 77 to a rotatable part of the valve 29 such as the crank arm 72 of the lever 37. The channel-shaped stop member 66 is moved into the path of the oscillating links 51 and 58 as shown by the broken line position of the channel-shaped member 66 in FIGS. 2 and 5 in response to movement of the valve 29 to the off position.

When the manually controlled linkage 36 is moved to the off position, the valve 29 is moved to the fluid communicating position shown in FIG. 4 thereby reversing the flow of fluid to the motor 23. At the same time the stop member 66 is moved by the Bowden wire 77 into the path of the reciprocating links 51 and 58. Reversing the flow of fluid pressure to the motor 23 causes the drive shaft 47 to rotate in a counterclockwise direction. The crank pin 49 moves the link 51 and linkage 52 in a counterclockwise direction until the lower edges of the head portions 59 and 61 engage the upper surface of the channel-shaped member 66. The torque developed by the motor 23 is sufficient to move the crank pin 49 downwardly in the slot 62 against the force of the leaf spring 63. The movement of the crank pin 49 in the slot 62 to the lower end of the slot increases the effective length of the link 51 and the linkage 52 which increase in length causes the wiper elements 17 and 17' of the respective wiper assemblies 12 and 13 to be moved to the park position adjacent the lower edge of the windshield 11. See FIG. 6.

In the operation of the windshield wiper assemblies 12 and 13 the operator of the motor vehicle moves the manually operated linkage 36 from the off to the on position. This movement positions the valve body 41 to supply fluid under pressure from the pump 26 to the fluid motor 23 which drives the crank arm 48 and crank pin 49 in a clockwise direction as shown by the arrow in FIG. 1 and moves the stop means 64 toward the fire wall 22 out of the path of movement of the link 51 and linkage 52. The leaf spring 63 biases the crank pin 49 against the upper end of the slot 62 and thereby eliminates any lost motion between the links 51 and 58. The pin 49 revolves around the axis of the drive shaft 47 in a clockwise circular path and moves the link 51 and linkage 52 in a reciprocating path. The reciprocating action of the link 51 and the linkage 52 drives the wiper assemblies 12 and 13 arcuately across the windshield 11 in a normal wiping pattern illustrated by the full line and broken line positions of the respective wiper assemblies in FIG. 1.

The wiping action of the wiper assemblies 12 and 13 is terminated by the manual movement of the control linkage 36 to the off position to operate the valve 29 for reversing the direction of flow of fluid to the motor 23. Movement of the valve 29 to the reverse flow position simultaneously moves the stop means 64 into the path of movement of the links 51 and 58 as shown in FIG. 7. When the direction of the flow of fluid to the motor 23 is reversed the drive shaft 47 of the motor is rotated in a counterclockwise direction thereby moving the links 51 and 58 into engagement with the stop 64. With the links 51 and 58 in engagement with the stop 64 the torque of the fluid motor 23 forces the crank pin 49 to the bottom of the slot 62 against the force of the spring 63. The stop 64 is positioned to engage the links 51 and 58 when the wiper elements 17 and 17' are adjacent the center portion of the windshield 11 as shown by the broken line of FIG. 1. From this position the increase of the effective length of the link 51 and the linkage 52 moves the wiper elements 17 and 17' to the park position adjacent the lower edge of the windshield 11 as shown in FIG. 6. The increase in the effective length of the wiper actuating linkage is the result of the movement of the crank pin 49 down the slot 62 against the force of the spring 63.

While there have been shown, described, and pointed out the fundamental novel features of the invention as applied to the preferred embodiment, it is to be understood that various omissions, substitutions, changes in form and details of the apparatus illustrated may be made by those skilled in the art, without departing from the spirit of the invention. It is intended to be limited only as indicated by the scope of the following claims.

I claim:

1. A control system for a windshield wiper apparatus having a wiper assembly including a wiper element which reciprocates in an arcuate path in a normal wiping pattern and to a park position comprising:
   (a) a source of fluid pressure,
   (b) motor means operable in response to fluid pressure and having a rotatable crank arm carrying a crank pin in a circular path,
   (c) linkage means connected at one end to said wiper assembly and at the other end to said crank pin, said other end of the linkage means having a slot for receiving the crank pin, the longitudinal axis of said slot intersecting the arc of the revolving crank pin so that relative movement between the pin and the linkage means will either increase or decrease the effective length of said linkage means,
   (d) spring means resiliently holding the pin at one end of said slot,
   (e) valve means connecting the source of fluid pressure to said motor means and operable to a position for reversing the flow of fluid pressure to said motor means thereby reversing the direction of movement of said crank pin,
   (f) stop means movable into the path of movement of said linkage means to limit the reverse movement of said crank pin and to permit relative movement between said pin and linkage means thereby increasing the effective length thereof to move the wiper element to the park position,
   (g) control means operatively associated with said valve means for controlling the operation thereof to regulate the direction of the flow of fluid to the motor means,
   (h) means connected to said valve means and said stop means for moving said stop means into the path of movement of said linkage means in response to the reverse flow position of said valve means, and
(i) by-pass valve means for limiting the pressure of the fluid supplied to said motor means.

2. A control system for a windshield wiper apparatus having a wiper assembly including a wiper element movable in an arcuate path between a normal wiping pattern and a park position comprising:
 (a) a source of fluid pressure,
 (b) motor means operable in response to fluid pressure and having a rotatable crank arm carrying a crank pin in a circular path,
 (c) linkage means connected at one end to said wiper assembly and at the other end to said crank pin, said other end of the linkage means having a slot for receiving the crank pin, the longitudinal axis of said slot intersecting the arc of the revolving crank pin so that relative movement between the pin and the linkage means will either increase or decrease the effective length of said linkage means,
 (d) spring means resiliently holding the pin at one end of said slot,
 (e) valve means connecting the source of fluid pressure to said motor means and operable to a position for reversing the flow of fluid pressure to said motor means thereby reversing the direction of movement of said crank pin, and
 (f) stop means movable into the path of movement of said linkage means to limit the reverse movement of said crank pin and to permit relative movement between said pin and linkage means thereby increasing the effective length thereof to move the wiper element to the park position.

3. A windshield wiper control system for a wiper assembly movable between a normal wiping pattern and a park position comprising:
 (a) a source of fluid pressure,
 (b) motor means operable in response to fluid pressure to produce a forward and reverse output force,
 (c) valve means connecting said source of fluid pressure to said motor means, said valve means operable to a position to reverse the flow of fluid to said motor means,
 (d) linkage means operably connected to said motor means and said wiper assembly and operable to transmit the forward and reverse output force from said motor means to said wiper assembly for moving the wiper assembly in the normal wiping pattern and to a park position, said connection between said linkage means on said motor means including a slot having a longitudinal axis which intersects the path of movement of the motor means output force so that relative movement between the linkage means and said motor means at said connection therebetween will increase the effective length of said linkage means in response to said reverse output force, and
 (e) stop means engageable with said linkage means in response to said reverse output force for limiting the movement of and increasing the effective length of said linkage means thereby moving the wiper assembly to a park position.

4. A windshield wiper control system for a wiper assembly movable between a normal wiping pattern and a park position comprising:
 (a) a source of fluid pressure,
 (b) motor means operable in response to fluid pressure to produce a forward and reverse output force,
 (c) valve means connecting said source of fluid pressure to said motor means, said valve means operable to a position to reverse the flow of fluid to said motor means,
 (d) linkage means operably connected to said motor means and said wiper assembly and operable to transmit the forward and reverse output force from said motor means to said wiper assembly for moving the wiper assembly in the normal wiping pattern and
 to a park position, said linkage means including means operable in response to said reverse output force for increasing the effective length of said linkage means,
 (e) stop means engageable with said linkage means in response to said reverse output force for limiting the movement of and increasing the effective length of said linkage means thereby moving the wiper assembly to a park position.

5. The windshield wiper control system defined in claim 4 including
 (a) means operatively connected to said valve means and said stop means for moving said stop means into the path of movement of said linkage means in response to the reverse flow position of said valve means.

6. A windshield wiper control system for a wiper assembly movable between a normal wiping pattern and a park position comprising:
 (a) a source of fluid pressure,
 (b) fluid motor means having a rotatable crank,
 (c) linkage means connecting the wiper assembly to the crank whereby rotation of said crank oscillates said wiper assembly in a normal wiping pattern and to a park position,
 (d) valve means connecting said source of fluid pressure to said motor means, said valve means operable to a position to reverse the flow of fluid to said motor means and the direction of rotation of said crank,
 (e) stop means movable into the path of movement of said linkage means to limit the reverse rotation of said crank thereby moving the wiper assembly to the park position.

7. The windshield wiper control system defined in claim 6 including
 (a) means operatively connected to said valve means and said stop means for moving said stop means into the path of movement of said linkage means in response to the reverse flow position of said valve means.

8. A control system for a windshield wiper apparatus having a wiper assembly including a wiper element movable in an arcuate path between a normal wiping pattern and a park position comprising:
 (a) reversible motor means having a rotatable crank arm carrying a crank pin in a circular path,
 (b) linkage means connected at one end to said wiper assembly and at the other end to said crank pin, said other end of the linkage means having a slot for receiving the crank pin, the longitudinal axis of said slot intersecting the arc of the revolving crank pin so that relative movement between the pin and the linkage means will either increase or decrease the effective length of said linkage means,
 (c) spring means resiliently holding the pin at one end of said slot,
 (d) motor control means operable to reverse the motor means thereby reversing the sense of movement of said crank pin, and
 (e) stop means movable into the path of movement of said linkage means to limit the reverse movement of said crank pin and to permit relative movement between said pin and linkage means thereby increasing the effective length thereof to move the wiper element to the park position.

9. The control system defined in claim 8 including
 (a) means operatively connected to said motor control means and said stop means for moving said stop means into the path of movement of said linkage means in response to operation of said motor control means to reverse the motor means.

10. A windshield wiper control system for a wiper assembly movable between a normal wiping pattern and a park position comprising:
 (a) motor means having a rotatable crank means, (b) linkage means connected to said wiper assembly and to said crank means, said connection between said linkage means and crank means including a slot having a longitudinal axis which intersects the arc of the rotating crank means so that relative movement between the linkage means and crank means will either increase or decrease the effective length of said linkage means, (c) motor control means operable to reverse the motor means to change the sense of rotation of said crank means, and (d) stop means movable into the path of movement of said linkage means to limit the reverse movement of said crank means and to permit relative movement between said linkage means and crank means thereby increasing the effective length thereof to move the wiper element to the park position.

References Cited in the file of this patent

FOREIGN PATENTS 1,062,132     Germany _____ July 23, 1959